United States Patent [19]

Jodrey et al.

[11] 4,253,904

[45] Mar. 3, 1981

[54] HIGH SPEED DECORATOR

[75] Inventors: Robert M. Jodrey, Westboro; Kenneth Young, Groton, both of Mass.

[73] Assignee: Dennison Manufacturing Company, Framingham, Mass.

[21] Appl. No.: 915,025

[22] Filed: Jun. 12, 1978

[51] Int. Cl.³ .............................................. B32B 31/00

[52] U.S. Cl. ...................................... 156/497; 29/775; 141/98; 141/114; 156/499; 156/542; 156/567

[58] Field of Search ............... 157/567, 230, 542, 443, 157/497, 538, 456–458, 499, DIG. 18; 141/1, 98, 114; 137/624.13, 625.21, 625.46; 29/709, 775, 785

[56] References Cited

U.S. PATENT DOCUMENTS

| | | | |
|---|---|---|---|
| 3,064,714 | 11/1962 | Flood | 156/542 |
| 3,208,897 | 9/1965 | Flood | 156/567 X |
| 3,892,264 | 7/1975 | Held | 141/114 X |

*Primary Examiner*—William A. Powell
*Assistant Examiner*—Thomas Bokan
*Attorney, Agent, or Firm*—George E. Kersey; Arthur B. Moore

[57] ABSTRACT

Method and apparatus for the decoration of bottles and the like at high speeds. Bottles are delivered by an input conveyor to a star wheel, which deposits them sequentially into a continuously rotating turret. The turret carries the bottles past a labelling site, where a label carrier strip is pressed into contact with a bottle surface and a label thereby transferred. The shape of the bottle is maintained during labelling by means of inflation of the bottles through an inserted nozzle. The raising and lowering of the inflating nozzle and the flow of inflating air is controlled by special valving apparatus. The motion of the label carrier strip past the labelling site is regulated by the use of rolls on a shuttle slide, which in turn is reciprocated by a second slide driven by a conjugate cam. This results in an increase of the local velocity of the carrier strip during most of the cycle, and a slowing of the strip during the balance. After labelling, the inflating nozzle is retracted from the bottle and the bottle is removed by a second star wheel for further processing.

7 Claims, 13 Drawing Figures

HIGH SPEED DECORATOR

BACKGROUND OF THE INVENTION

The present invention relates to the decoration of bottles and the like, and more particularly to decoration of bottles by means of heat transfer labelling.

Decorating systems using heat transfer labels have received widespread commercial acceptance over the last decade. Such decorating systems are typically characterized by conveyors for feeding the objects to be labelled, usually bottles; a turret for sequentially positioning the bottles at a labelling station; a feed mechanism for transporting labels supported by a carrier strip to the labelling station, and a device for pressing a label against an adjacent bottle at the labelling station. Examples of such systems appear in U.S. Pat. Nos. 2,981,432; 3,036,624; 3,064,714; 3,208,897; 3,231,448; 3,261,734; 3,313,667; 3,709,755; and 3,861,986.

A particular requirement in designing turrets which may be used in labelling non-rigid articles, such as plastic bottles, is that some means be included to maintain the shape of the bottle during the label transfer, which typically involves significant pressures on the bottle face. A solution which has been widely adopted to meet this problem is the inclusion of a device to inflate the bottles during transfer, thus maintaining their shape through internal air pressure. Such devices are exemplified by that disclosed in U.S. Pat. No. 3,064,714 (cf. FIG. 5; cols. 3,4). Any inflating device must be synchronized in operation with the remainder of the labelling apparatus. It is desirable that the controlling apparatus for such inflating devices operate quickly and reliably. Furthermore, well-designed inflation control apparatus should be usable with turrets of different sizes and constructions. Inflation apparatus in the prior art inadequately satisfies these criteria.

Typical label carrier feed apparatus utilizing a method which is adopted in principle in the carrier transport of the invention is disclosed in U.S. Pat. No. 3,208,897. The main constituents of this type of transport are the label-bearing carrier strip, feed and guide rolls (the latter are dancer and idler rolls), a meter roll, two shuttle rolls, and cams with followers regulating the motion of the shuttle rolls.

The feed mechanism for transporting the carrier strip with labels to and from the labelling area must be carefully timed so that during labelling the carrier strip will be moving at the same speed as the tangential speed of the bottle to be decorated. The linear speed of the pressing means, label-carrier strip, and bottle surface is a critical limiting factor in heat transfer labelling; the quality of the transfer deteriorates if this speed is too high.

In the carrier strip transport systems typified by that disclosed in the above patent, the carrier strip speed is regulated by establishing a basic strip speed (registered by the meter roll) which represents a desired average rate of advance over the entire labelling cycle, and modifying this basic strip speed in the region of transfer so that it equals the more rapid linear speed of the bottle surface during transfer. The user may space the transfer labels fairly closely together on the carrier strip, as the same speed modifying means retards the advance of the carrier strip between labelling periods. The shuttle rolls and cams regulating their motion are used to locally modify the basic carrier transport speed. In all of these prior art decorating devices, "dwells" or idle periods are included in the rotation of the turrets in order to facilitate the loading and unloading of articles to be decorated. This requires a retarding period in the strip speed modifying means which is equal in duration to the accelerating period, and presents a severe limiting factor in the production rates of these decorators. Furthermore, the reciprocating motion of such prior art shuttle rolls is of undesirably large amplitude. This generally requires larger components and introduces greater disturbing forces, thus causing significantly increased mechanical problems. Ultimately, this imposes speed limitations on the carrier transport.

Accordingly, it is a principal object of the invention to provide decorating apparatus of the type described above with increased efficiency and higher production rates. A related object of the invention is to provide more reliable mechanical operations in such apparatus.

Another object of the invention is to achieve a turret with improved inflating apparatus for non-rigid articles to be labelled. A related object of the invention is to provide inflating apparatus of rapid, timely operation. Another related object is to avoid the need to redesign such inflating apparatus when used in turrets of varying size or construction.

A further object of the invention is to incorporate into the decorating apparatus a label carrier strip transport which may be used in conjunction with a continuously rotating turret. A related object of the invention is to modify the carrier strip speed in the labelling area to provide a relatively long accelerating period during labelling and a relatively brief retarding period in the interim. Yet another object of the invention is to reduce the magnitude of the reciprocating shuttle roll motion.

SUMMARY OF THE INVENTION

In accomplishing the above and related objects, the high speed decorator of the invention includes input and output star wheels, a continuously rotating turret having bottle holding and bottle inflating means, a label carrier strip transport with speed modification in the labelling area, and label preheating and pressing devices. Bottle inflation is effected upon the insertion of an air nozzle into the bottle, and is regulated by valving apparatus controlling the position of the nozzle and the flow of air therethrough. A basic speed of the label carrier strip is increased in the labelling area during the greater part of the labelling period, and retarded during the relatively short time between labelling.

In accordance with one aspect of the invention, the high speed decorator includes a continuously rotating turret, with no "dwells" for insertion or removal of bottles. Bottles are inserted and removed during turret rotation by adjacent star wheels.

In accordance with another aspect of the invention, the raising and lowering of inflating nozzles is controlled by the operation of a valve plate assembly which predicates the vertical position of the nozzle upon the angular position of the nozzle and associated bottle. The valve plate assembly includes an upper stationary plate and a lower plate which rotates in conjunction with the turret. The upper plate contains pressurized and venting apertures which take the form of annular zones and is in a face seal with the lower plate. The lower plate contains ports, each of which contacts either a venting zone or pressurized zone at any point of rotation, causing the port to be pressurized or vented.

In accordance with a further aspect of the invention, each of the inflating nozzles is mounted on a tube which is in turn coupled to a piston within an actuating cylinder. The actuating cylinder contains upper and lower outlets which are connected by air lines to ports in the rotating valve plate. Pressurization at one outlet and venting at the other effects a raising or lowering of the piston and connected air nozzle.

In accordance with yet another aspect of the invention, the flow of air through the inflating nozzle is automatically initiated upon the lowering of the nozzle, and terminated on the raising of the nozzle. This is accomplished by the confinement of the nozzle-carrying tube in a piston valve assembly. The lowering of the tube through the piston valve assembly causes the connection of a duct in the tube to a source of low pressure inflating air and the raising of the tube breaks this connection.

In accordance with an additional aspect of the invention, the label carrier strip transport is a variant of the formerly disclosed apparatus employing local speed modification by shuttle rolls, reciprocating slides, and a regulating cam. A conjugate cam is employed to provide asymmetric reciprocation of the slides. During the majority of the period, the throw of the conjugate cam causes the movement of the shuttle rolls toward the left, locally accelerating the carrier strip motion for the purpose of label transfer. During the relatively short period between transfers, the cam throw causes a rapid return of the shuttle rolls. In a preferred embodiment of the invention, an approximate temporal ratio of three to one is employed for the accelerating and return periods.

BRIEF DESCRIPTION OF THE DRAWINGS

These and other aspects of the high speed decorator of the invention will become apparent in considering a preferred embodiment of the decorator in conjunction with the drawings in which.

DETAILED DESCRIPTION OF THE INVENTION

Figure 1:
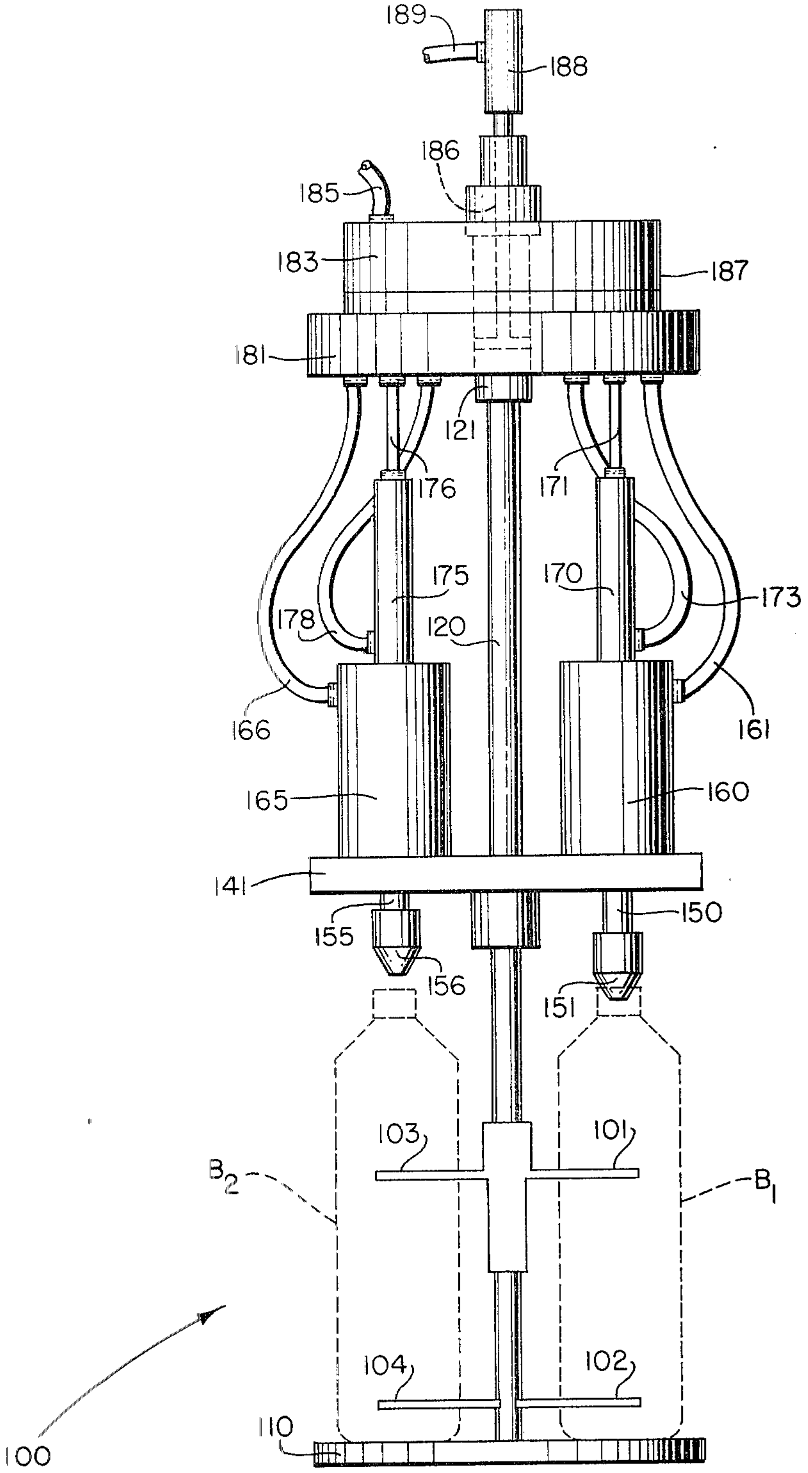
FIG. 1 is a partial elevation view of a two bottle turret.

Reference should now be had to FIGS. 1 through 11 for a detailed description of the invention. The high speed decorator of the invention includes a continuously rotating turret 100, having bottle holding and inflating components, input and output star wheels 350 and 360, a label carrier strip supply and transport 300, and a label applying device 310. The functions performed by the above apparatus may be combined with prior and subsequent processing steps, such as preheating and postheating of the bottles, as is well known to skilled practitioners of the art.

FIG. 1 illustrates a particular embodiment of a turret assembly 100 including bottle inflating apparatus in accordance with the invention. The turret assembly, in decorating machines of this type, acts to engage bottles presented to it by an input conveyor or other means, rotates these bottles to the site of label transfer and past the label carrier strip at a predetermined linear (tangential) speed, and after further rotation releases the labelled bottles for further processing. When designing a turret for non-rigid articles such as plastic bottles, some means of inflating the bottles during the labelling period is advantageously incorporated.

An illustrative turret assembly 100 includes a rotatable central shaft 120 which is housed in a stationary base (not shown). A platform 110 rotates along with shaft 120. Spiders 101, 102, 103, and 104 have bottle holding stations, and are similarly rotatable. The turret assembly shown accommodates two bottles $B_1$ and $B_2$, but it is equally possible to use the inflating apparatus of the invention with turrets holding more than two bottles.

A bracket 141 is firmly secured to central shaft 120, and carries two piston valve assemblies 160 and 165, one on each side. Each piston valve assembly is adapted to allow the projection and retraction of a tube (150, 155) to which is appended an air nozzle (151, 156). Each tube has a vertical orientation.

The raising and lowering of tube 150 relative to piston valve assembly 160 is controlled by actuating cylinder 170. When air pressure is applied to cylinder 170 through air hose 171, a piston (not shown) in cylinder 170 is forced downward, thereby expelling the air from the lower part of cylinder 170 through air hose 173. This causes tube 150, to which the piston is coupled, to be lowered through cylinder 160 until nozzle 151 rests in the bottle mouth, as shown. When air pressure is released from hose 171 and applied through hose 173, the converse process occurs and tube 150 is retracted from the mouth of bottle $B_1$. An identical process occurs in cylinder 175, although at different times. Means for effecting these air pressure differentials are discussed infra.

Figure 2:
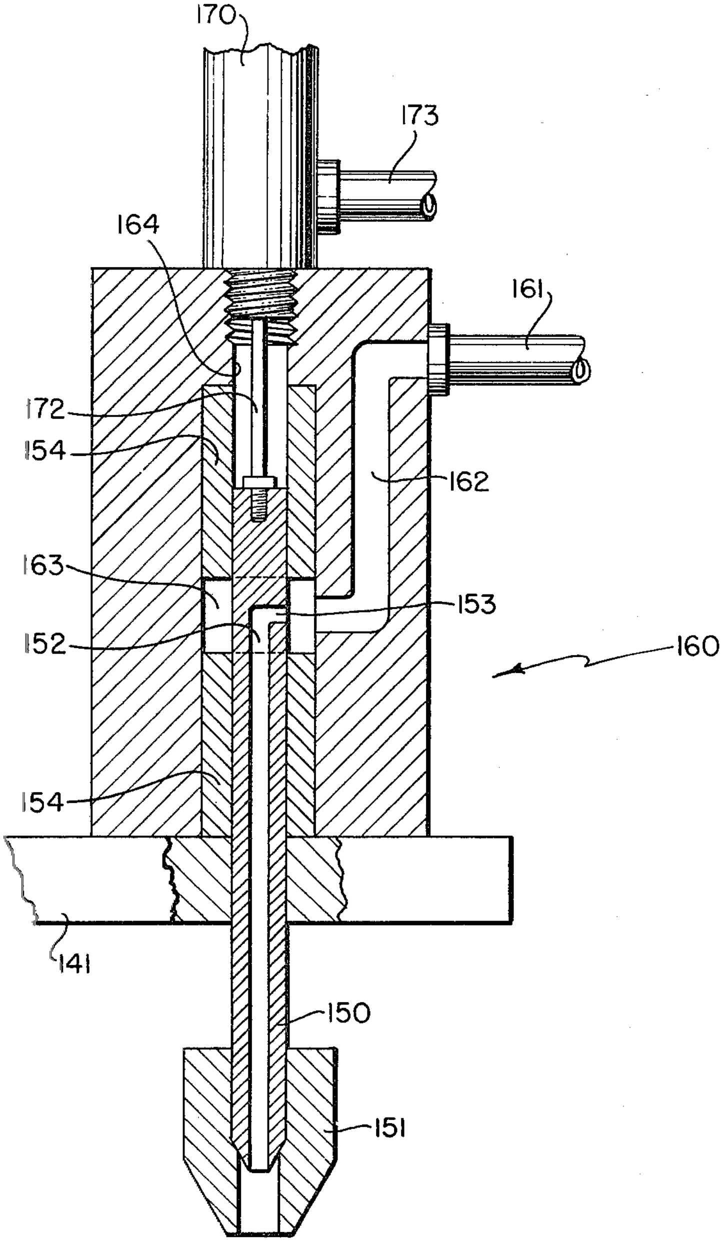
FIG. 2 is a cutaway view of a piston valve assembly shown in cooperation with adjacent parts of the turret of FIG. 1.

FIG. 2 illustrates the internal valving arrangement within one of the piston valve assemblies (assume assembly 160). Through this valving, the projection and retraction of tube 150 is coordinated with the flow of air through nozzle 151, which thereby emits air only when the nozzle is inserted into a bottle. Piston valve assembly 160 is secured to bracket 141, and in turn carries a smaller diameter air cylinder 170 (shown in part). Air cylinder 170 is advantageously screwed into assembly 160 at the top of a central bore 164 in the latter. A piston (not shown) within air cylinder 170 is connected by piston rod 172 to the top of tube 150. Central bore 164 houses two bushings 154, which have an inner diameter permitting the restricted vertical movement of tube 150. These bushings create between them a circumferential chamber 163, which receives a steady supply of low pressure air from air line 161 via connecting passage 162. Tube 150 contains a central duct 152 which connects the outlet of nozzle 151 to an aperture 153 in the side of tube 150.

When the piston in air cylinder 170 is down, causing tube 150 to be lowered as shown in FIG. 2, aperture 153 communicates with chamber 163, and low pressure air passes through duct 152 and out nozzle 151. When tube 150 is raised, aperture 153 no longer communicates with chamber 163 and the flow of air is interrupted.

With further reference to FIG. 1, a protective housing (not shown) is advantageously placed around the section of rotating turret 100 between bracket 141 and a rotating valve plate 181, inclusive. An enlarged segment 121 of the rotating central shaft carries two face valve plates, 181 and 183. Lower plate 181 is secured to the rotating shaft 121 and rotates therewith, whereas upper plate 183 is secured to a stationary supporting member (not shown), and does not rotate. Air line 185 feeds high pressure air into an aperture in upper plate 183 for the purpose of raising and lowering the pistons in air cylinder 170 and 175. This air passes through one of air hoses 171, 173, 176, or 178 when a corresponding port in lower plate 181 rotates to a point of coincidence with a pressurized groove in upper plate 183. This is discussed more fully infra.

Low pressure air is also fed through air line 189 for the purpose of inflating bottles via air lines 161 and 166 (see FIG. 1). This air passes through rotary joint 188, through duct 186 in rotating shaft 121, and thence into channels in lower plate 181, as discussed within.

Air which is vented from cylinders 170 and 175 eventually escapes through outlet 187 from channels in stationary plate 183.

FIGS. 3A, 3B, 4, and 5 show in various views an embodiment of the lower valve plate 181 to be used in conjunction with a two bottle turret. Valve plate 181, which is a face seal plate, rotates along with central shaft 121. In the bottom plan view of FIG. 3A, lower plate 181 has an essentially flat face 200 in which six ports, 201*b* through 206*b*, appear. In a plate for an N bottle turret, N groups of three ports would be symmetrically placed on face 200. With reference to a given group of ports 201*b*, 203*b* and 205*b*, the outermost port, 201*b*, is at a radius $r_1$, port 203*b* is at smaller radius $r_2$, and port 205*b* is at the smallest radius $r_3$. Ports 203*b* and 205*b* lie on different radii which are illustratively separated by an angle of 40°, with port 201*b* on the bisecting radius. Bottom face 200 has diameter $D_1$. The various ports in face 200 are machined to allow the connection of air lines from cylinders 160, 165, 170, and 175. Air line 161 is connected to port 201*b*, air line 171 is connected to port 203*b*, and air line 173 is connected to port 205*b*. Similarly, air line 166 is connected to port 202*b*, air line 176 to port 204*b*, and air line 178 to port 206*b*.

Figure 3A:
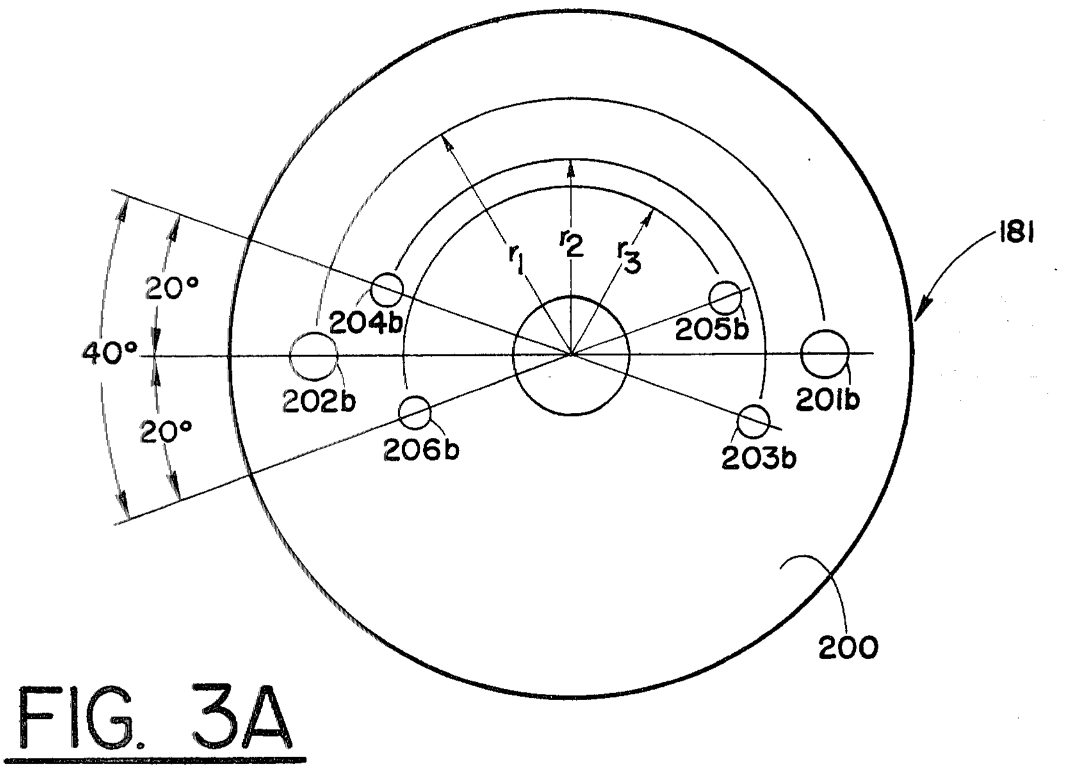
FIG. 3A is a bottom plan view of the lower valve plate of FIG. 1.
Figure 3B:
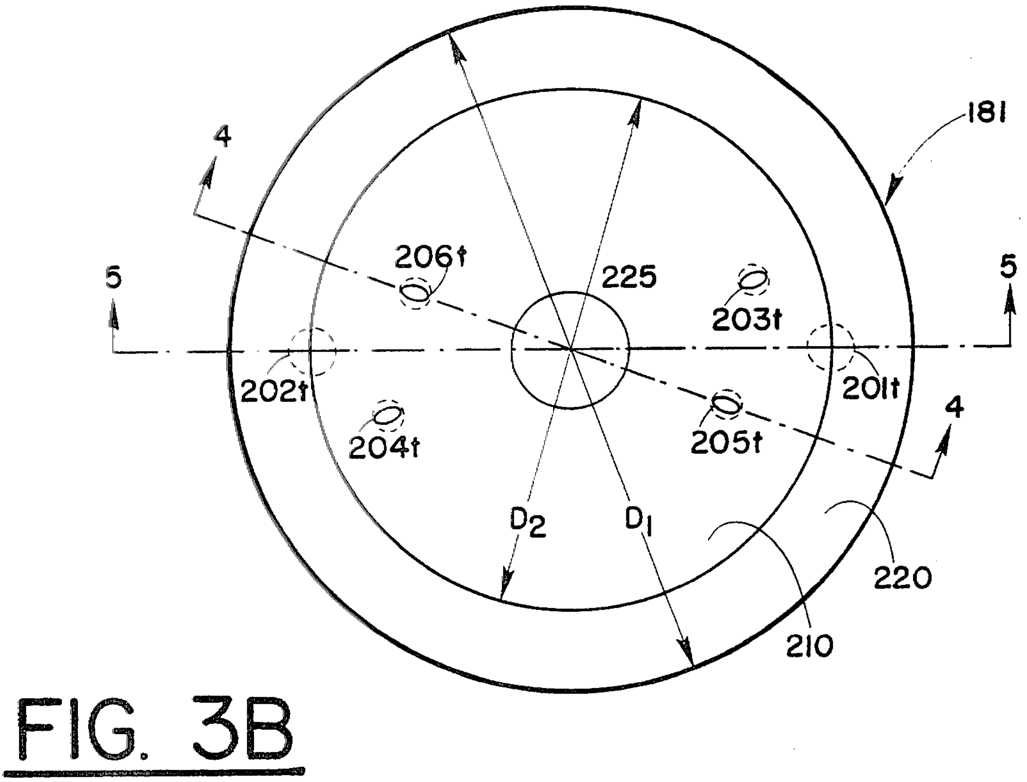
FIG. 3B is a top plan view of the lower valve plate of FIG. 1.

In the top plan view of FIG. 3B, valve plate 181 has an elevated face 210 of diameter $D_2$ and an indented face 220 of diameter $D_1$, where $D_1$ is somewhat larger than $D_2$. Only four ports, 203*t*, 204*t*, 205*t*, and 206*t* can be seen in this view, and these are somewhat smaller than the corresponding ports in the bottom face, as can be seen by comparison with the surrounding dotted outlines. The projected locations of ports 201*t* and 202*t* are also shown in dotted outline.

Figure 4:
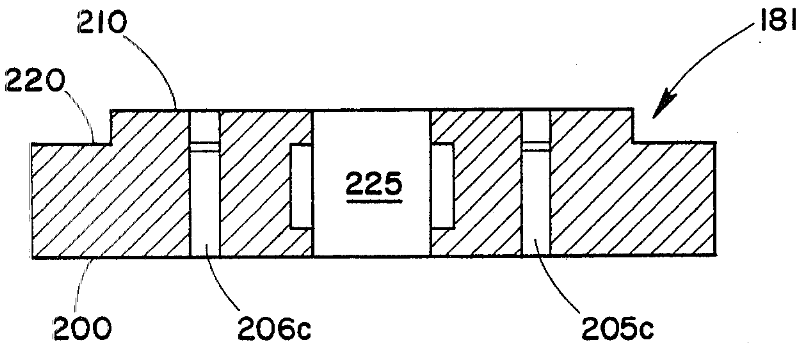
FIG. 4 is a section along the lines 4—4 of FIG. 3B.

FIG. 4 illustrates a sectional view of plate 181 taken through the section 4—4 of FIG. 3B, which passes through ports 205*t* and 206*t*. The elevated face 210 of plate 181 contacts the lower face of stationary upper plate 183. These two faces should be lapped to very flat surfaces, in order to assure precise valving action and minimum air leakage. An axial cavity 225 in lower plate 181 allows the plate to be fitted and secured to rotating central shaft 121. Two vertical channels 205*c* and 206*c* connect upper ports 205*t* and 206*t* with lower ports 205*b* and 206*b*. These channels narrow toward the top of lower plate 181 in order to provide superior valving action.

Figure 5:
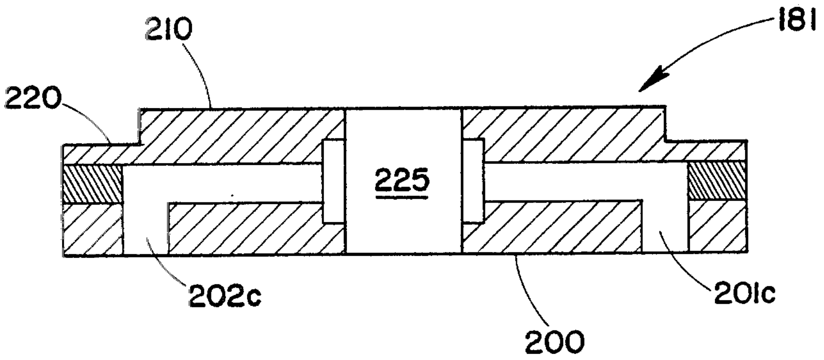
FIG. 5 is a section along the lines 5—5 of FIG. 3B.

FIG. 5 depicts a sectional view of valve plate 181 taken along the section 5—5 in FIG. 3B, which passes through projected ports 201*t* and 202*t*. In this view, it can be seen that two L-shaped channels, 201*c* and 202*c*, connect the axial cavity 225 with lower ports 201*b* and 202*b*, respectively. The horizontal segments of these channels are advantageously drilled from the perimeter of valve plate 181, and the outermost sections then plugged. These channels are used to feed low pressure air to bottle-inflating air lines 161 and 166. Low pressure air passes through duct 186 in central shaft 121 (see FIG. 1), and into channels 201*c* and 202*c*, which are connected to air lines 161 and 166. These air lines are therefore constantly pressurized. The enlarged central portion of axial cavity 225 provides an annular chamber around the outlets of duct 186, thus eliminating the need to precisely align these outlets with channels 201*c* and 202*c*.

Figure 6A:
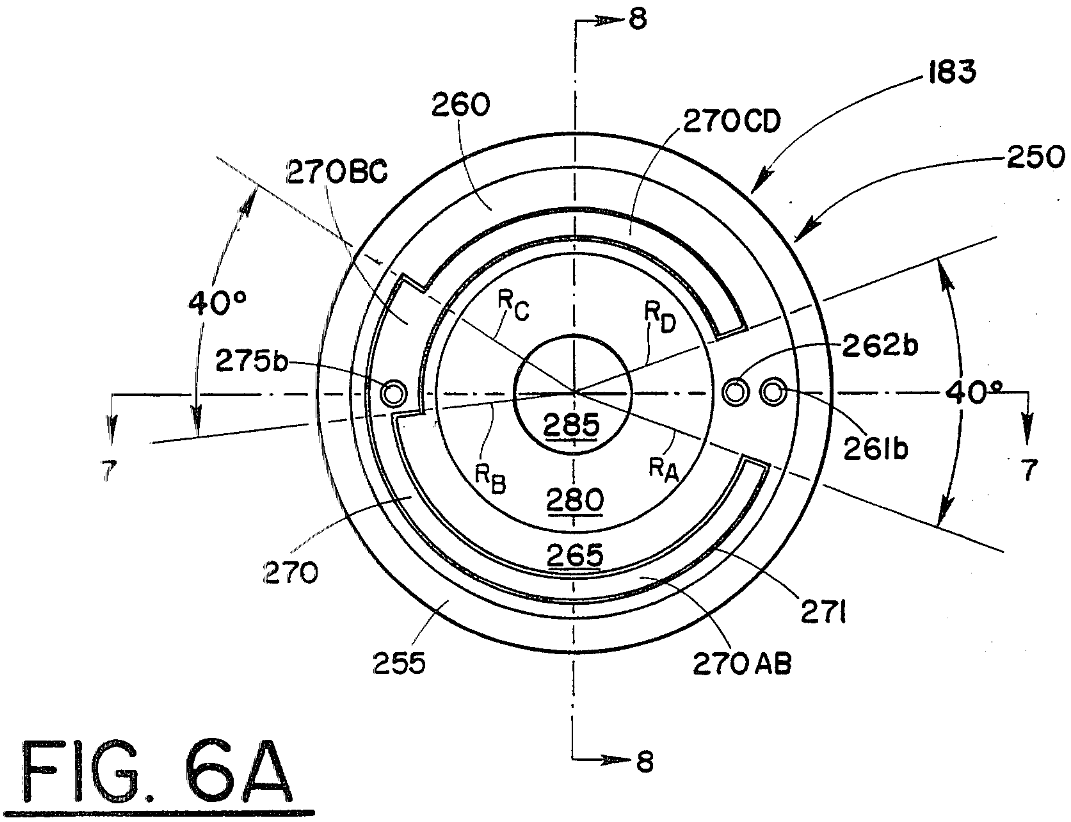
FIG. 6A is a bottom plan view of the upper valve plate of FIG. 1.

FIGS. 6A, 6B, 7, and 8 display various views of upper valve plate 183. This plate remains stationary during the rotation of turret 100. The bottom plan view of FIG. 6A shows a bottom face 250 which contacts the upper face of valve plate 181, and which has approximately the same diameter $D_2$ as the elevated face 210 of lower plate 181. Face 250 has alternating raised and recessed annular regions, with the latter serving as pressurized or venting regions. More specifically, there is a peripheral raised band 255, an outer venting region 260 (recessed), a raised border strip 271 which defines an interior pressurized region 270 (recessed), an inner venting region 265 (recessed), and a raised central area 280. In addition, there is an axial cavity 285 similar to cavity 225 in lower plate 181.

The essential features of bottom face 250 which lend upper plate 183 its valving characteristics are found between outer band 255 and central area 280. The two venting regions 260 and 265 merge in the sector between radii $R_A$ and $R_D$, and are vented through venting ports 261*b* and 262*b* in this area. This sector encompasses 40°. The pressurized region 270 has a profile defined by raised border strip 271, which is best characterized by reference to the four radii $R_A$, $R_B$, $R_C$, and $R_D$ in FIG. 6A. Pressurized region 270 covers the angle from $R_A$ clockwise to $R_D$. 270AB or the section of region 270 from $R_A$ to $R_B$, has a mean radius of $r_2$ and a width equalling the radial dimension of port 023*t*. Thus, when valve plates 181 and 183 are coaxially joined and port 203*t* (at radius $r_2$) falls within sector AB, it will communicate with region 270AB. 270CD is at mean radius $r_3$ and of the same width as 270AB, thus ensuring contact with port 205*t* when this port falls within sector CD. Region 270BC represents a merger of the two above regions in sector BC, plus the area covered by the intervening border strip 271. Thus, both 203*t* and 205*t* will fall within 270BC. Pressurizing port 275*b* lies within 270BC. Region 270BC illustratively encompasses an angle of 40° (identical to the angle of separation of 203*t* and 205*t*).

Figure 6B:
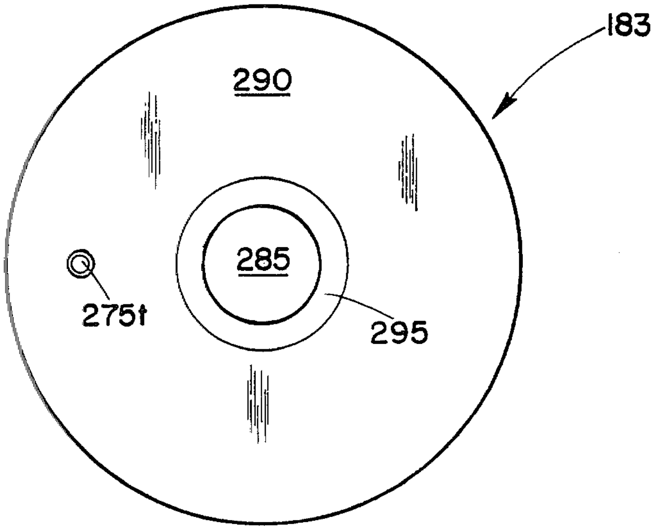
FIG. 6B is a top plan view of the upper valve plate of FIG. 1.

As seen from above, in the plan view of FIG. 6B, plate 183 has a plain outer band 290 in which lies pressurizing port 275*t*, an indented face 295, and axial cavity 285.

Figure 7:
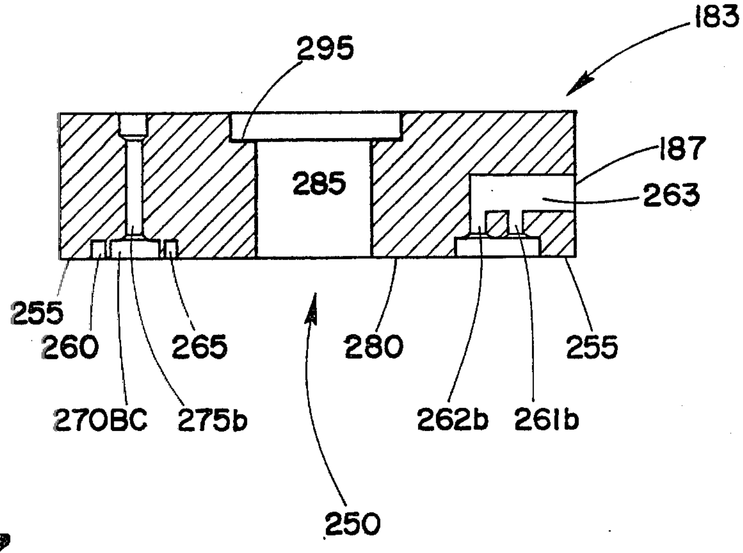
FIG. 7 is a section along the lines 7—7 of FIG. 6A.

FIG. 7 shows a sectional view of upper plate 183 in the section 7—7 of FIG. 6A, taken through pressurizing port 275*b* and venting ports 261*b* and 262*b*. On the left can be seen pressurizing channel which terminates in port 275*b* in region 270BC of lower face 250. Pressurizing port 275*t* is connected to a source of high pressure air, 185 (see FIG. 1). Two venting grooves, 260 and 265, also appear. On the right, the two venting ports 261*b* and 262*b* in lower face 250 feed into a venting channel 263. Venting channel 263 terminates in outlet 187 (see FIG. 1).

Figure 8:
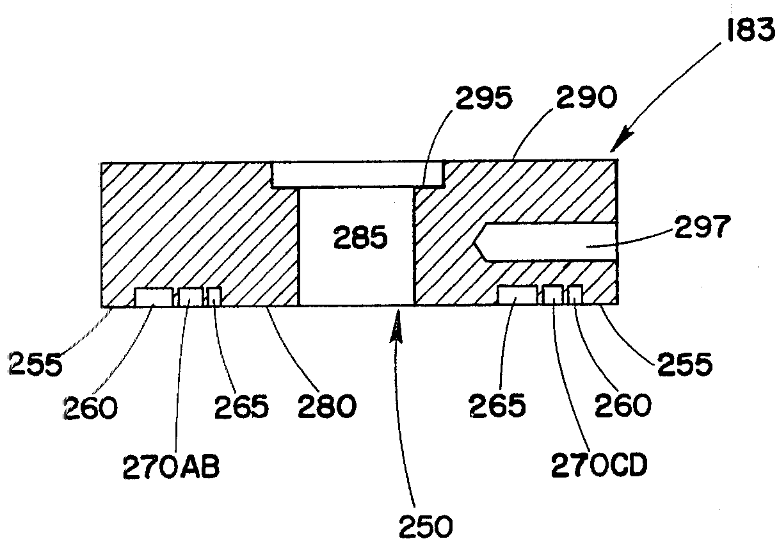
FIG. 8 is a section along the lines 8—8 of FIG. 6A.

In the sectional view of FIG. 8, taken through 8—8 in FIG. 6A, somewhat different pressurized region and venting region profiles appear in bottom face 250. The purpose of indented face 295 is to allow the spring loading of upper plate 183 onto lower plate 181. This acts as a countervailing force against the tendency of plate 183 to be lifted by the high pressure air between the two valve plates. A hole 297 is reamed into the perimeter of upper plate 183 in order to allow the insertion of a pin (not shown). This pin is used to adjustably secure plate 183 to an external support (not shown), thus preventing the rotation of upper plate 183 while allowing a precise angular placement for valving purposes. Axial cavity 285 allows the free rotation of central shaft 121.

The operation of the above valving apparatus in the operation of turret 100 of the invention may be illustrated with reference to FIGS. 1 through 8. Spiders 101 and 102 on turret 100 engage a bottle $B_1$ while turret 100 is continuously rotating in a counterclockwise manner. At this time, port 203*t* is under sector DA, while port 205*t* (which lags by an angle of 40°) is in region 270CD. Thus, the bottom of actuating cylinder 170 is pressurized via air line 173, while the top is vented, and nozzle 151 is in the raised position. Shortly thereafter, port 203*t* enters region 270AB while port 205*t* roughly simultaneously enters sector DA. This causes high pressure air to pass through air line 171 while air line 173 is vented. A rapid downward movement of the piston (not shown) in cylinder 170 results, causing the insertion of nozzle 151 into bottle $B_1$. Due to the valving in actuating cylinder 160 and lower valve plate 181, inflating air from air line 189 enters bottle $B_1$. During this period, a label is applied to bottle $B_1$.

Shortly after labelling, port 203*t* passes from region 270BC into outer venting region 260, while port 205*t* passes from region 265 into region 270BC. High pressure air therefore enters air line 173, while air line 171 is quickly vented to atmosphere. This causes the piston in air cylinder 170 to rapidly rise, and nozzle 151 to retract from the mouth of bottle $B_1$. During this period, bottle $B_1$ is removed from spiders 101 and 102 and turret assembly 100 is in readiness for a subsequent bottle.

A second bottle $B_2$ undergoes the same process, but half a revolution later of turret 100. Thus, for example, if port 203*t* were in the middle of 270AB, and port 205*t* in 265, causing nozzle 151 to be down, port 204*t* would be in region 260, and port 206*t* in region 270CD, causing nozzle 156 to be up. This state is shown in FIG. 1. For turrets accommodating larger numbers of bottles, the phase lag would be commensurately smaller.

The above valving system possesses special advantages when employed in conjunction with the turret of the present invention. Whereas prior art turret motion invariably included idle periods, or "dwells", between the labelling periods during which the turret was in motion, the turret of the present invention is in continuous motion. The elimination of these dwells, which typically accounted for half the time consumed by the decorating cycle, therefore approximately doubles the production rate without increasing the velocity of decoration. The valving apparatus of the invention is well suited to this higher speed turret operation; by imposing minimal restrictions on the air lines, it allows high speed operation of the inflating apparatus.

This valving arrangement furthermore enjoys the advantage that it may be employed with any turret assembly which is designed to accommodate a given number of bottles, without any need to adapt to a change in bottle size. This is due to the fact that the design of valve plates 181 and 183 is simply a function of the number of bottles, and the lower valve plate 181 may be connected to cylinder 170 and assembly 160 (which might be moved in a turret for larger bottles) by flexible air hoses.

The use of a continuously rotating turret, with its advantages of higher production rates, imposes certain requirements on the input and output conveying devices. As there are no dwells during which to load bottles onto the turret and unload these after labelling, a device capable of transferring bottles to a moving turret must be used. The solution adopted in the present invention, which is known in the prior art, is the employment of star wheels 350 and 360 (see FIG. 9). A bottle $B_1$, engaged by an input conveyor (not shown), is carried to star wheel 350 which transfers the bottle to the continuously rotating turret 100. After labelling, star wheel 360 removes the bottle from the moving turret and transfers it to an output conveyor (not shown).

Figure 9:
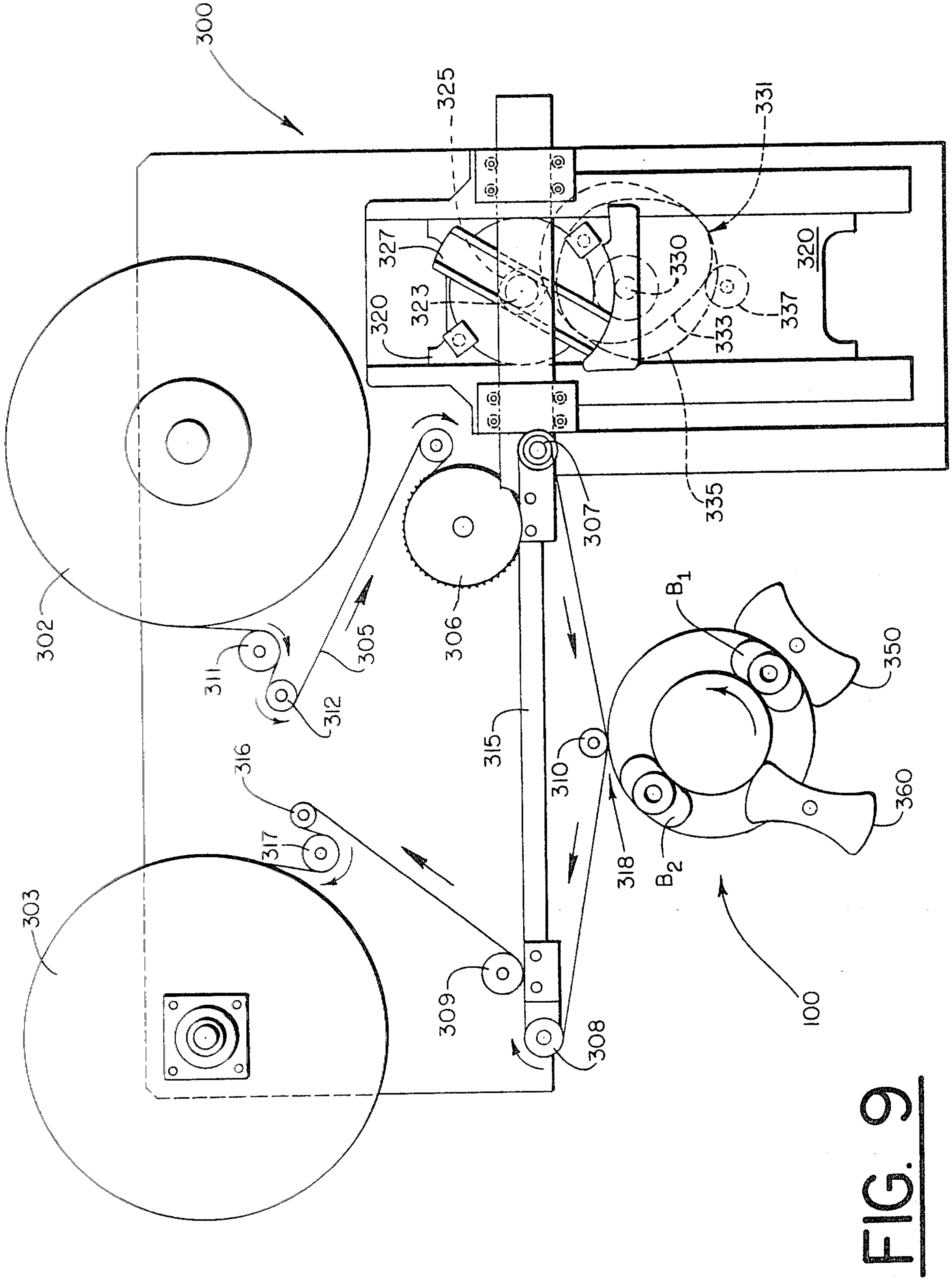
FIG. 9 is a partial plan view of the label carrier strip transport and the area of label application.

The general organization of the label supplying and applying apparatus of the present invention is shown in FIG. 9. The label-carrier strip 305 is unwound from a spool 302 and fed at a constant, metered rate by a sprocket wheel 306 to and around a guide roll 307 at one end of a reciprocating slide 315. Carrier strip 305 is advantageously subjected to heating means (not shown) in order to preheat the labels in preparation for transfer. The carrier strip 305 passes adjacent to turret 100 where labels are pressed onto a surface of an article to be decorated by a freely mounted roller 310, which is adapted to move at the same linear speed as the carrier strip 305 during labelling. The carrier strip 305 then winds around a guide roll 308 at the other end of slide 315, around an idler roll 309, and is taken up on a spool 303. Rolls 311, 312, 316, and 317 are used to provide the desired carrier strip tension.

A conjugate cam 331 having lobes 333 and 335 is mounted on shaft 330, and engages followers 325 and 337 on a slide 320 in order to reciprocate this slide. Angularly adjustable cam block 327 acts through follower 323 to impart a proportionate part of the motion of the slide 320 to the slide 315 carrying rolls 307 and 308.

By means of the adjustable cam block 327, the slide 315 is given a stroke such that the speed of the label-carrier strip 305 is locally modified to accommodate the basic rate at which the strip is wound and unwound, determined by meter roll 306, and the more rapid speed at which labels are applied. By the same token, the strip speed modifying means reduces the basic strip speed during the periods between labelling.

Figure 10:
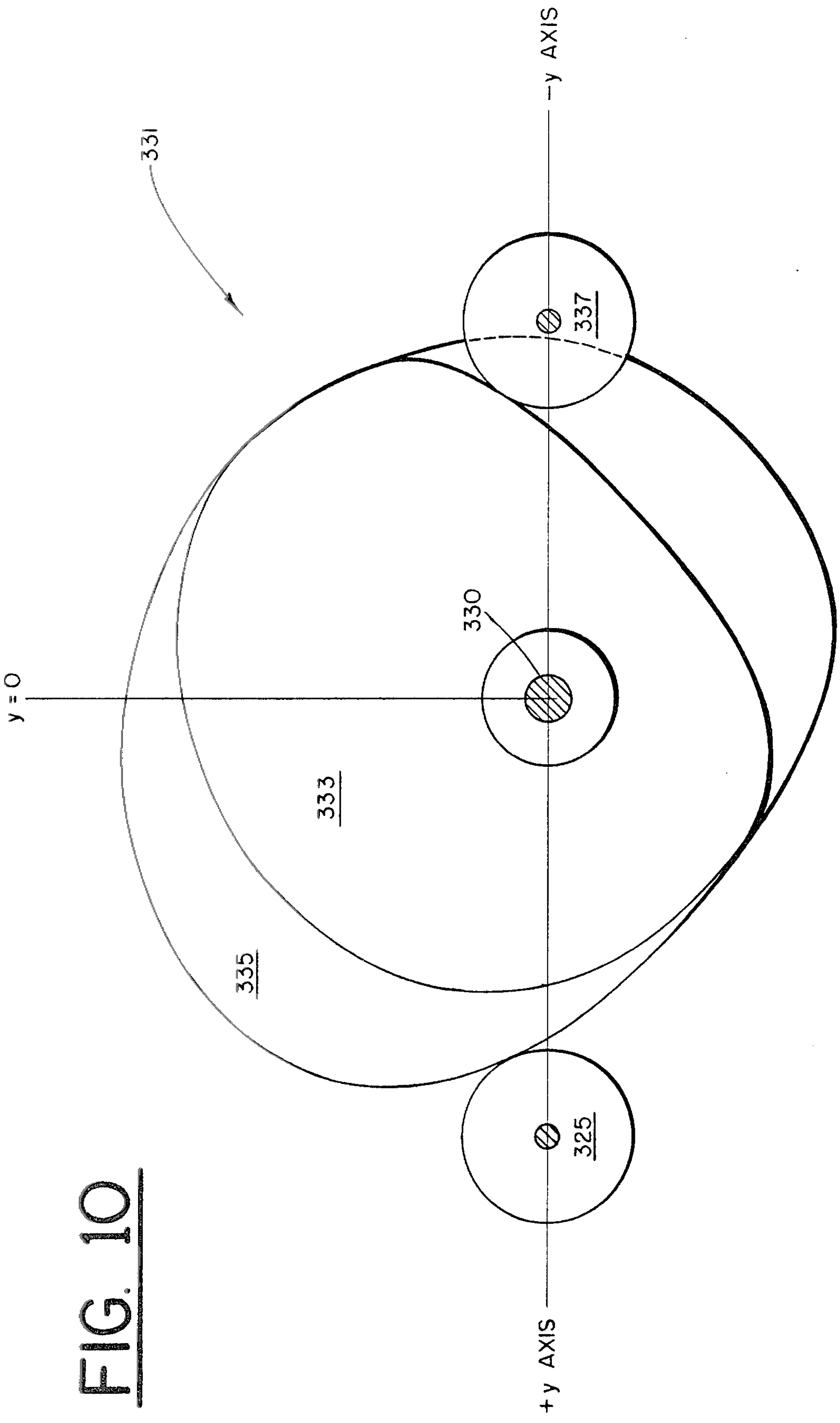
FIG. 10 is a schematic view of the conjugate cam and associated followers of FIG. 9, as seen from above.

In the high speed labelling method of the invention, bottles are presented at the labelling site 318 by a continuously rotating turret, with no dwell in the turret motion between labelling periods. This mandates strip speed modifying apparatus which will allow a relatively long labelling period and a relatively short label return period, as opposed to the equal periods of the prior art. This is accomplished by the incorporation of conjugate cam 331. The plan view of FIG. 10 shows a smaller upper lobe 333 and a larger lower lobe 335. Follower 337, which is attached to slide 320, tracks upper lobe 333, while follower 325 tracks lower lobe 335. Follower 325 is attached to slide 320, and governs the motion of cam block 327 via follower 323. Followers 325 and 337 are separated by a constant distance throughout the cam rotation. Cam lobes 333 and 335 are advantageously fabricated as a single piece, and in any event do not rotate relative to one another.

Figure 11:
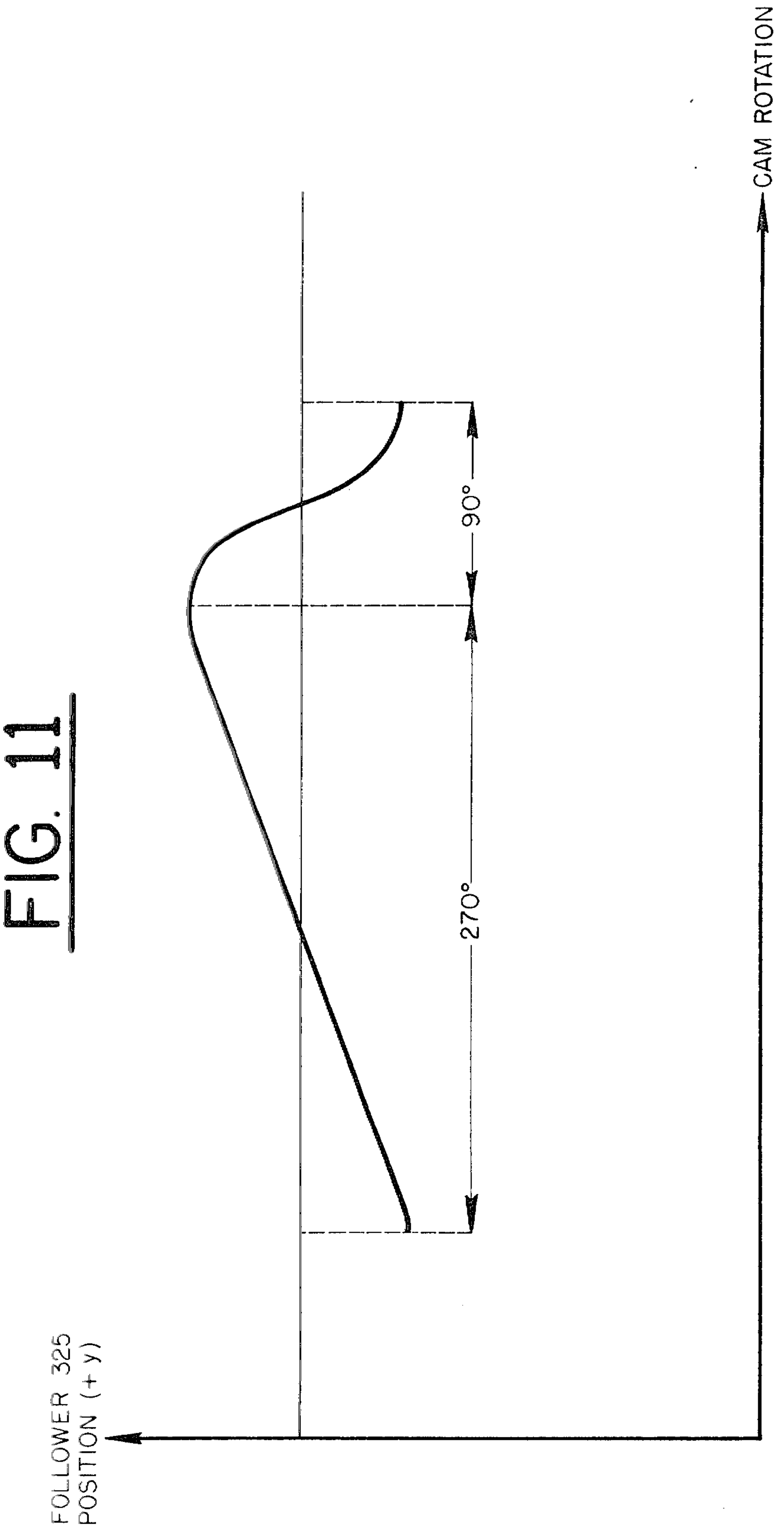
FIG. 11 is a plot of the linear position of a cam follower against the angular position of the conjugate cam of FIG. 10.

The motion of cam follower 325 on the +y axis of FIG. 10 (taking the cam axle 330 as y=0) is plotted in FIG. 11. Approximately 270° of the cam rotation period is consumed by a linear rise of the follower position. During this period reciprocating slide 315 moves toward the left at a constant speed, causing a fixed increase in the speed of carrier strip 305 past the labelling site 318. During the balance of cam rotation, or approximately 90°, follower 325 returns to its original position at a more precipitous rate. Conjugate cam 333 and 335 may be contoured, as well known to those skilled in the art, in order to keep $d^2y/dt^2$ and $d^3y/dt^3$ within practical values.

It has been found that a smooth operation of the above label carrier strip speed modifying apparatus in conjunction with a continuously rotating turret dictates an advantageous range of about 0.65 to 0.85 for the ratio of the strip accelerating period to the entire cam rotation period. The preferred value for this ratio, illustrated by the plot of FIG. 11, is 0.75.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. An improved turret for holding N articles to be labeled, where N is greater than or equal to 1, said turret including article holding means and means for rotating the turret to deliver articles to and away from a labeling site, wherein the improvement comprises apparatus for inflating these articles during labeling comprising:

N article inflating members;

means for raising and lowering the article inflating members, comprising a N-manifold assembly which provides either a raising signal or a lowering signal to each article inflating member depending on the angular position of said article inflating member with respect to the axis of rotation of said turret; and means for controlling the flow of air through each article inflating member to automatically ensure that such flow occurs only when the inflating member is lowered into an article.

2. A turret for holding articles as defined in claim 1 wherein said raising and lowering means comprises:

a stationary valve plate containing pressurized apertures and venting apertures;

a valve plate which rotates in conjunction with the rotation of the turret, containing N configurations of ports, which rotating plate contacts the stationary valve plate in a face seal, whereby a port rotating into communication with a pressurized aperture will become pressurized, and a port rotating into communication with a venting aperture will be vented;

N actuating cylinders, each having a piston which is coupled to an article inflating member, and each having a top air outlet and a bottom air outlet, whereby pressurization at one outlet and venting at the other will cause a motion of the piston in the venting direction; and for each actuating cylinder, conduits connecting each outlet to a port in a corresponding configuration on the rotating plate.

3. A turret for holding articles to be labelled as defined in claim 2 wherein the rotating valve plate and the stationary valve plate have circular cross sections, and the N configurations of ports are symmetrically arrayed on the rotating plate, each configuration comprising a port for the top actuating cylinder outlet and a port for the bottom actuating cylinder outlet.

4. A turret for holding articles to be labelled as defined in claim 3 wherein each configuration of ports further includes a port for article inflating air.

5. A turret for holding articles to be labelled as defined in claim 2 wherein the stationary valve plate is divided into sectors, such that for each section a given combination of venting and pressurization occurs at the upper and lower actuating cylinder outlets, whereby the article inflating member is appropriately raised or lowered in that sector.

6. A turret for holding articles to be labelled as defined in claim 5 wherein:

the pressurized apertures and venting apertures are annular zones;

in any given sector each annular zone has a constant radius with respect to the axis of rotation of the lower plate; and for each configuration of ports in the rotating plate, the port corresponding to the upper air cylinder outlet is at one radius while the port corresponding to the lower air cylinder outlet is at another radius with respect to the axis of rotation of the lower plate, whereby in any given sector each port will contact a venting or a pressurized zone at the same radius.

7. A turret for holding articles to be labelled as defined in claim 1 wherein said article inflating member comprises a tube carrying an inflating nozzle and containing a duct running from said inflating nozzle to an aperture in the side of said tube, and wherein said means for controlling the flow of air comprises:

a source of inflating air;

N piston valve assemblies, each containing a central bore through which one of said nozzle carrying tubes may slide between raised and lowered positions, and a passage connecting said source of inflating air to the central bore, located so that said passage will communicate with the aperture on the side of said tube when the tube is in the lowered position, but not when the tube is in the raised position.

* * * * *